A. Perrin,
Planking Clamp.
N° 42,222.                    Patented Apr. 5, 1864.
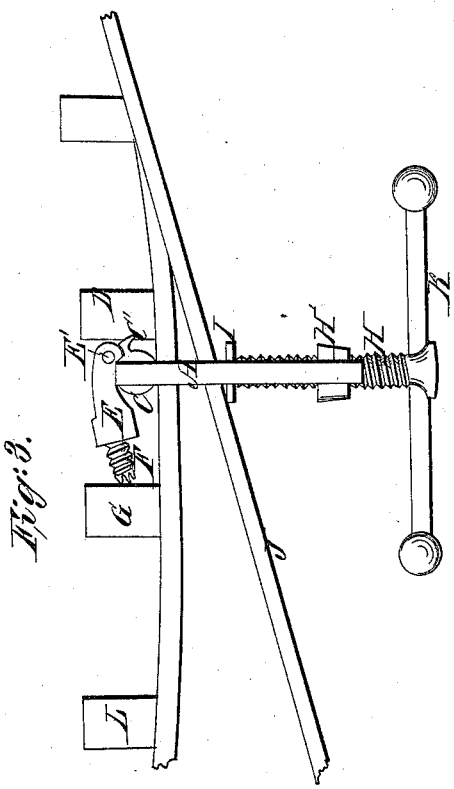
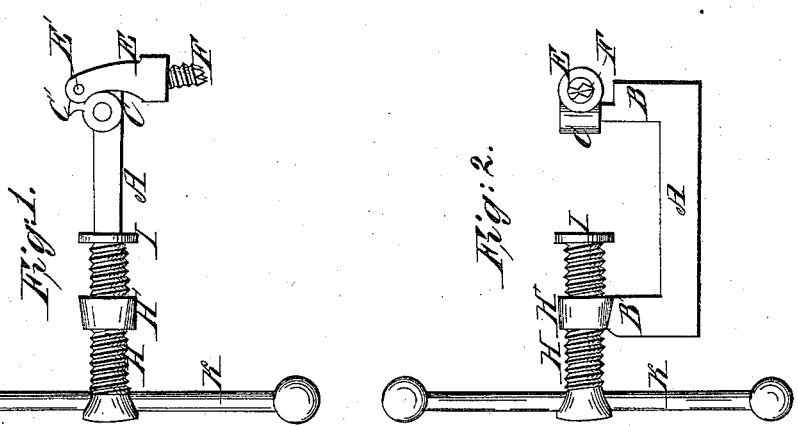
Witnesses:                              Inventor:

UNITED STATES PATENT OFFICE.

ABRAM PERRIN, OF CLEVELAND, OHIO.

IMPROVED PLANKING-SCREW.

Specification forming part of Letters Patent No. 42,222, dated April 5, 1864.

*To all whom it may concern:*

Be it known that I, ABRAM PERRIN, of Cleveland, in the county of Cuyahoga and State of Ohio, have invented new and useful Improvements in Planking-Screws for Vessels; and I do hereby declare that the following is a full and complete description of the construction and operation of the same, reference being had to the accompanying drawings, making part of this specification, in which—

Figure 1 is a view of the under side. Fig. 2 is a side view, and Fig. 3 is a top view showing the manner of its operation.

Like letters refer to like parts in the several views.

The nature of my invention relates to a device for bending the plank so as to cause them to form contact with the ribs of the vessel, in order the more conveniently to secure them with spikes, whereby one man is enabled to perform with much more facility and ease that which usually requires the labor of two or three men.

In the several figures, A represents a strong bar of iron, with both ends turned at right angles, as shown in Fig. 2.

To the arm B, which is about a foot in length, I attach a self-adjusting fulcrum, C, which works on a round tennon upon the end of the arm B. This fulcrum is provided with a spur, C', which is placed against the side of a rib, D, as shown in Fig. 3. A lever, E, is pivoted to the fulcrum C, as shown at E' in Figs. 1 and 3. At the opposite end of the lever E, I insert a dog-screw, F, the end of the lever forming the nut for the same. This dog-screw can be run out or in to adjust the apparatus to the exact distance between the ribs of the vessel, as shown at D G in Fig. 3. The outer end of the dog-screw is furnished with spurs or teeth, which are pressed into the timber of the rib of the ship, as shown at G, to make it hold against a pressure outward, as hereinafter specified. A strong screw, H, passes through the end of the arm B', having its nut H' formed in the end of the arm. On the inner end of the screw H, I place a face plate, I, which comes in contact with the plank J, which is being bent to the curve of the side of the vessel, as shown in Fig. 3. The outer end of the screw H is provided with a pin, K, by means of which the screw is operated.

The operation of this planking-screw is as follows: One end of a plank, previously cut to the correct width and length, is spiked to a rib of the vessel or ship in the usual manner. The spur C' of the fulcrum C is placed against the side of a rib, as shown in Fig. 3, and the lever E directed a little obliquely toward the next rib, as shown in Fig. 3, and the screw F run out till it comes in contact with the side of the rib, as seen at G, the bar A being above the plank. The screw H is now turned so as to bring the face-plate I in contact with the plank J, and by turning the screw H so that it presses hard against the plank the fulcrum C is drawn out, which operation forces the spur C' into the timber of the rib D, and this movement of the fulcrum pushes the lever E toward the rib G, embedding the teeth of the screw F into the timber of the rib G, making the whole secure. Now, by further turning the screw H the plank J will be firmly pressed against the rib D, when it can be spiked on. The screw H is now turned backward, which releases the whole apparatus, when it can be moved to the next space between the ribs G and L, and the screw F adjusted as before, when by turning the screw H the plank J can be brought into contact with the rib G, and so on to the end of the plank.

What I claim as my invention, and desire to secure by Letters Patent, is—

The bar A, arms B B', fulcrum C, lever E, screws F and H, the several parts being arranged and operating as and for the purpose specified.

A. PERRIN.

Witnesses:
 J. BRAINERD,
 W. H. BURRIDGE.